US009143265B2

(12) United States Patent
Kikuchi

(10) Patent No.: US 9,143,265 B2
(45) Date of Patent: Sep. 22, 2015

(54) OPTICAL POLARIZATION MULTILEVEL SIGNAL RECEIVING APPARATUS, OPTICAL POLARIZATION MULTILEVEL SIGNAL TRANSMITTING APPARATUS, AND OPTICAL POLARIZATION MULTILEVEL SIGNAL TRANSMISSION APPARATUS

(71) Applicant: HITACHI, LTD., Tokyo (JP)

(72) Inventor: Nobuhiko Kikuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 162 days.

(21) Appl. No.: 13/928,822

(22) Filed: Jun. 27, 2013

(65) Prior Publication Data

US 2014/0010538 A1    Jan. 9, 2014

(30) Foreign Application Priority Data

Jul. 3, 2012  (JP) .................................. 2012-149833

(51) Int. Cl.
| | |
|---|---|
| H04B 10/50 | (2013.01) |
| H04J 14/06 | (2006.01) |
| H04B 10/69 | (2013.01) |
| H04B 10/532 | (2013.01) |
| H04B 10/61 | (2013.01) |

(52) U.S. Cl.
CPC ............ *H04J 14/06* (2013.01); *H04B 10/5053* (2013.01); *H04B 10/5055* (2013.01); *H04B 10/532* (2013.01); *H04B 10/6166* (2013.01); *H04B 10/695* (2013.01)

(58) Field of Classification Search
CPC ........... H04B 10/5053; H04B 10/5055; H04B 10/532; H04B 10/6166; H04B 10/695; H04J 14/06
See application file for complete search history.

(56) References Cited

U.S. PATENT DOCUMENTS

| | | | |
|---|---|---|---|
| 4,831,663 A | 5/1989 | Smith | |
| 7,469,106 B2 * | 12/2008 | Feced et al. | .................... 398/202 |
| 8,175,466 B2 * | 5/2012 | Djordjevic et al. | ........... 398/202 |

(Continued)

FOREIGN PATENT DOCUMENTS

EP    2 405 620 A1    1/2012

OTHER PUBLICATIONS

P.J. Winzer et al., "Spectrally Efficient Long-Haul Optical Networking Using 112-Gb/s Polarization-Multiplexed 16-QAM," Journal of Lightwave Technology, vol. 28, No. 4, Feb. 15, 2010, pp. 547-556.

(Continued)

*Primary Examiner* — Leslie Pascal
(74) *Attorney, Agent, or Firm* — Mattingly & Malur, PC

(57) ABSTRACT

The optical signal to noise ratio is improved when the polarization multilevel signal light is demodulated. A optical polarization multilevel signal receiving apparatus is provided with a polarization multilevel receiver configured to generate at least one estimation symbol A1 to AN estimating a state of the symbol A by utilizing a polarization state of at least one polarization multilevel symbol received in a past before the symbol A, a past value of a decision variable, and a decision result, average the estimation symbols A1 to AN and the symbol A to calculate a reference symbol Ar, and use the calculated reference symbol Ar in place of the symbol A to calculate a decision variable corresponding to a polarization state change of the received symbol R, where R is a received symbol and A is at least one past symbol used as a reference for a change.

9 Claims, 11 Drawing Sheets

(56) References Cited

U.S. PATENT DOCUMENTS

| | | | |
|---|---|---|---|
| 8,498,544 B2* | 7/2013 | Duan et al. | 398/208 |
| 2005/0180760 A1* | 8/2005 | Feced et al. | 398/183 |
| 2007/0147850 A1* | 6/2007 | Savory et al. | 398/208 |
| 2008/0025733 A1 | 1/2008 | Nazarathy et al. | |
| 2009/0129787 A1* | 5/2009 | Li et al. | 398/208 |
| 2009/0208224 A1* | 8/2009 | Kikuchi | 398/141 |
| 2010/0232804 A1 | 9/2010 | Djordjevic et al. | |
| 2012/0134676 A1 | 5/2012 | Kikuchi | |

OTHER PUBLICATIONS

S. Benedetto et al., "Multilevel polarization modulation using a specifically designed LiNbO3 device," IEEE Photonics Technology Letters, vol. 6, Issue 8, pp. 949-951, Aug. 1994.

J. Blaikie et al., "Multilevel Differential Polarization Shift Keying", IEEE Transactions on Communications, vol. 45, No. 1, Jan. 1997.

European Search Report received in European Application No. 13174837 dated Sep. 30, 2013.

* cited by examiner

PRIOR ART

PRIOR ART

PRIOR ART

PRIOR ART

OPTICAL POLARIZATION MULTILEVEL SIGNAL RECEIVING APPARATUS, OPTICAL POLARIZATION MULTILEVEL SIGNAL TRANSMITTING APPARATUS, AND OPTICAL POLARIZATION MULTILEVEL SIGNAL TRANSMISSION APPARATUS

CLAIM FOR PRIORITY

The present application claims priority from Japanese patent application JP 2012-149833 filed on Jul. 3, 2012, the content of which is hereby incorporated by reference into this application.

BACKGROUND OF THE INVENTION

1. Field of the Invention

The present invention relates to transmitting an optical polarization multilevel signal on an optical fiber.

2. Description of the Related Art

In ultra-high speed optical fiber transmission, a wavelength multiplexing transmission system is widely used in which multiple optical signals having different wavelengths are bundled for transmission in order to effectively utilize a wavelength range (or a frequency band) available for the signal transmission. In this transmission system, the transmitting side bundles and transmits multiple optical signals having different wavelengths and the receiving side receives the optical signals split into the original wavelengths, and thereby the transmission of the signals is made.

Also, to effectively utilize the frequency band, polarization multiplexing transmission is under study. The polarization multiplexing transmission system uses a multiplexing technique utilizing the difference of polarization states of light. According to the system, in the transmitting side, two pairs of optical signals modulated with an independent information signal are converted into a mutually orthogonal polarization states to be multiplexed and then transmitted to an optical fiber. The polarization state of the optical signal can be expressed as a point on the Poincare sphere surface.

By the way, it is known that the polarization state of the optical signal is subject to change during the transmission through the optical fiber. This change in the polarization state can be represented as a random conversion on the Poincare sphere surface. It is noted that the orthogonality of the polarization state is maintained after the change during the transmission. By utilizing the property, the receiving side performs a converting operation of the polarization state and a splitting operation of the polarization to split the received optical signal into two original optical signals that have been multiplexed at the transmitting side. As such, the polarization multiplexing transmission system achieves the transmission of twice as much information by using the same wavelength width as the wavelength multiplexing transmission system.

Described below is a technique for achieving the optical polarization multiplexing transmission system, that is, the optical polarization multiplexing technique at the transmitter and the optical polarization splitting technique at the receiver. First, the coherent polarization multiplexing transmission system that is one of the conventional techniques of the polarization multiplexing optical receiver will be described. P. J. Winzer, "Spectrally Efficient Long-Haul Optical Networking Using 112-Gb/s Polarization-Multiplexed 16-QAM," JOURNAL OF LIGHTWAVE TECHNOLOGY, VOL. 28, NO. 4, Feb. 15, 2010, pp. 547-556 is one of the documents disclosing the configuration of the apparatus that supports this type of transmission system.

FIG. 1, which is comprised of FIGS. 1A and 1B, illustrates an example of the conventional digital coherent polarization multiplexing transmission system. FIG. 1A represents the configuration of a polarization multiplexing optical multilevel transmitter 100 of the system and FIG. 1B represents the configuration of a polarization diversity coherent optical multilevel receiver 120 of the system.

The polarization multiplexing optical multilevel transmitter 100 splits a non-modulated laser beam output from a transmission laser source 104 into two at an optical splitter 105 and inputs them into two quadrature optical field modulators 106-1 and 106-2. The quadrature optical field modulator (or referred to as the IQ modulator) is configured with two pairs of the MZ modulators arranged in parallel on a substrate such as Lithium Niobate. In response to a fast-modulated voltage signal applied to the modulation signal input terminal of the MZ modulator, the in-phase component (the I component or the real part) and the quadrature component (the Q component or the imaginary part) of the optical field of the output light output from the output terminal can be independently modulated.

Input information signals 101-1 and 101-2 to be transmitted are encoded to multilevel signals (such as 16QAM, for example) by multilevel encoded circuits 102-1 and 102-2, respectively. The in-phase component and the quadrature component of the multilevel signal are converted into an analog electric waveform by D/A converters 103-1 to 103-4 in a fast operation and then input into the in-phase and the quadrature modulation terminals of the two quadrature optical field modulators 106-1 and 106-2.

As a result, the output lights from the respective quadrature optical field modulators 106-1 and 106-2 are turned into independent multilevel modulation lights modulated on a two-dimensional complex plane, respectively. They are converted so that the polarization states are orthogonal to each other, input to a polarization multiplexing circuit 107 as an optical modulation signal 108 of S polarization and an optical modulation signal 109 of P polarization, and output from an output optical fiber 110 as a polarization multiplexing optical multilevel signal 111.

FIG. 2A is a schematic diagram of the signal constellation according to the optical multilevel modulation and the polarization multiplexing transmission. FIG. 2A shows a sixteen-level quadrature amplitude modulation (16QAM) as an example of the signal constellation according to the optical multilevel modulation. In the 16QAM, the signal constellation is arranged in a grid-like pattern and four bits of information can be transmitted per one symbol. The example in the figure represents the values of two high-order bits (10xx, 11xx, 01xx, 00xx) on the Q axis coordinate and the values of two low-order bits (xx10, xx11, xx01, xx00) on the I axis coordinate.

Such multilevel signal can be generated by inputting the multilevel electrical signal (four-level in this example) to the input terminal of the in-phase component modulation signal and the input terminal of the quadrature component modulation signal of FIG. 1, respectively, and designating the field coordinate (i(t), q(t)) of the in-phase component and the quadrature component. At this time, the optical field of the optical modulation signal of the X polarization output from the quadrature optical field modulators 106-1 and 106-2 is expressed as (i(t)+jq(t))exp(jωt). Here, ω is an optical angular frequency of a transmission laser source 104, and j is a unit of the imaginary number. It is noted that, when a complex optical field signal is generated, the voltage signals of the real part i(t) and the imaginary part q(t) of the complex field signal may be generated using an ultra-high speed DA converter to apply them to the input terminal for the in-phase component modulation signal and the input terminal for the quadrature component modulation signal.

FIG. 2B represents the concept of the polarization multiplexing. The optical wave is one sort of the electromagnetic waves. Thus, there are two independent orthogonal polarization sates (for example, the horizontal polarization and the vertical polarization) in the optical wave depending on the vibration direction of the field with respect to its propagation direction. Therefore, two optical field components (the S polarization component and the P polarization component in the figure) can be modulated with separate information signals, multiplexed, and transmitted.

Returning to the description of FIG. 1A, the polarization multiplexing optical multilevel signal 111 output from the above-described polarization multiplexing optical multilevel transmitter 100 is transmitted through the optical fiber of, for example, a few tens to a few thousands km. In this case, the polarization multiplexing optical multilevel signal 111 is subject to transmission impairment due to chromatic dispersion and the like in the optical fiber and is received by the polarization diversity coherent optical multilevel receiver 120 of FIG. 1B. Here, the coherent reception refers to a system in which the output light of the local oscillation laser source 124 located inside the receiver is used as the reference for detection of the field component of the optical signal.

A received polarization multiplexing optical multilevel signal 121 input from an input optical fiber 122 is input to a polarization splitting optical 90-deg. hybrid circuit 125 after being appropriately amplified by an optical amplifier 123 and the like. The polarization splitting optical 90-deg. hybrid circuit 125 splits the input signal into four sets of optical signals of the X polarization components (in-phase and quadrature components) and the Y polarization components (in-phase and quadrature components) and outputs them to four balance optical receivers 126-1 to 126-4, respectively.

It is noted that the optical frequency of the local oscillation laser source 124 located within the receiver is set to substantially the same as the received polarization multiplexing optical multilevel signal 121, and its output light is connected to one input port of the polarization splitting optical 90-deg. hybrid circuit 125. The output light of the local oscillation laser source 124 is also distributed to the balance optical receivers 126-1 to 126-4 through the polarization splitting optical 90-deg. hybrid circuit 125.

In respective balance optical receivers 126-1 to 126-4, the input signal light and the local oscillation light are interfered and the lights obtained from the interference are converted into electrical signals. The electrical signals are sampled and converted into digital signals at A/D converters 127-1 to 127-4 and output to the digital signal processor.

In the digital signal processor, first, the component corresponding to the inverse function of the chromatic dispersion superimposed at the optical fiber transmission path is applied at a semi-fixed dispersion compensation circuit 128. Thereby, the waveform degradation subjected at the optical fiber transmission path is compensated. The signal in which the degradation has been compensated is provided to a polarization beam splitter 129. The polarization beam splitter 129 detects the quadrature polarization component during transmission to perform a polarization conversion, and splits and extracts the original S polarization component and P polarization component of the transmitting side. The S polarization component is output to a sampling circuit 130-1 and the P polarization component is output to a sampling circuit 130-2. In the sampling circuits 130-1 and 130-2, the data at the center time in the waveform is extracted. Next, in frequency and phase estimation circuits 131-1 and 131-2, the IF offset frequency component and the phase fluctuation component are removed. Then, in multilevel signal decision circuits 132-1 and 132-2, a decision and decoding process of the multilevel signal is performed, and output information signals 133-1 and 133-2 are obtained.

It is noted that, in general, a framer and error correction circuit is arranged in the subsequent stage of the receiver (transponder). The framer and error correction circuit analyzes the received signal to find the head of the data frame, and performs an error correction process utilizing error correction information pre-provided before the transmission, and a process of channel and monitoring information by reading out the information in the header.

Described below will be the modulation system other than the above-described polarization multiplexing transmission system in which the polarization of the optical signal is utilized. Here, the transmission system referred to as polarization multilevel modulation system in which multiple polarization states of the optical signal are utilized for information transmission will be described. The polarization multilevel modulation system is disclosed in S. Benedetto, "Multilevel polarization modulation using a specifically designed LiNbO3 device," IEEE Photonics Technology Letters, Vol. 6, Issue 8, pp. 949-951, for example.

The principle of the polarization multilevel modulation system will be described below based on the Poincare sphere diagrams of FIGS. 3A-3D. The Poincare sphere is typically a sphere in which the radius is normalized (for example, to "1") as illustrated in FIG. 3A and, with respect to the typical optical signal (the polarization degree is sufficiently high), the polarization state can be expressed as a point on the sphere surface. When three axes of the Poincare sphere are denoted as S1, S2, and S3 and the longitude and latitude of the signal point (the white circle) are measured as illustrated in FIG. 3A, the longitude serves as a parameter representing a manner of inclination of the polarization plane and the latitude serves as a parameter representing an ellipticity.

Each position on the Poincare sphere corresponds to the actual polarization state as seen in FIG. 3B. For example, at the intersection of the S1 axis and the sphere plane surface, the positive side represents the TE polarization (for example, the S polarization), and the negative side represents the TM polarization (for example, the P polarization). Further, on the equator (S3=0), the linear polarizations with different inclination are aligned in order. At the north pole and the south pole, the counterclockwise and the clockwise circler polarizations are arranged, and most parts on the sphere surface other than the above represent polarization states with any inclination and any ellipticity. It is noted that two points on the sphere surface located in the opposite positions interposing the center of the sphere represent the mutually orthogonal polarizations.

The multilevel polarization modulation system addressed in S. Benedetto, "Multilevel polarization modulation using a specifically designed LiNbO3 device," IEEE Photonics Technology Letters, Vol. 6, Issue 8, pp. 949-951 is the multilevel modulation in which one polarization state of a plurality of polarization states set on the Poincare sphere is selectively transmitted. For example, FIG. 3C represents an arrangement example of the polarization states (signal points) in the case of the twelve-level polarization modulation (12PolSK). It is noted that the twelve signal points are arranged to have wide intervals between the signals and be evenly close to each other as illustrated in FIG. 3C. Each signal point on the Poincare sphere can be generated by arbitrarily modulating the amplitude and the phase of the optical field and can be used in combination of the polarization multilevel modulation and the conventional multilevel modulation.

FIGS. 4A and 4B are configuration diagrams of the conventional polarization multilevel transmission system using a digital coherent technique. FIG. 4A represents the configuration of a polarization multilevel optical transmitter 140 and FIG. 4B represents the configuration of a polarization multilevel coherent optical receiver 143.

The polarization multilevel optical transmitter 140 inputs the input information signals 101 all together into a polarization multilevel encoder (POLENC) 141 to encode them into the desired polarization state and field state. By the encoding here, generated are the optical modulation signal 108 of the S polarization component having any amplitude and phase and the optical modulation signal 109 of the P polarization component similarly having any amplitude and phase. The polarization multiplexing circuit 107 coherently multiplexes the two optical modulation signals 108 and 109 to generate any polarization multilevel and optical multilevel signal 142.

The apparatus configuration of the polarization multilevel optical transmitter 140 illustrated in FIG. 4A is substantially the same as that of the polarization multiplexing optical multilevel transmitter 100 illustrated in FIG. 1A, but different in that it is necessary to create the path lengths and/or the modulation timing in a high accuracy because of the needs of the coherent addition of the S polarized optical modulation signal 108 and the P polarized optical modulation signal 109, and therefore the configuration of the apparatus is slightly complicated.

The apparatus configuration of the polarization multilevel coherent optical receiver 143 illustrated in FIG. 4B is also similar to that of the polarization diversity coherent optical multilevel receiver 120 illustrated in FIG. 1. One of the differences is in that the polarization beam splitter 129 (FIG. 1B) is replaced with a polarization state estimation circuit 144 (FIG. 4B). The internal parts of the optical transmission apparatus and/or the optical fiber transmission path currently used do not have the mechanism for holding the primary axis of the polarization in a constant direction. Therefore, the mapping of the signal points of the received polarization multilevel signals onto the Poincare sphere exhibits a state that is subjected to the three-dimensional rotation in any direction with respect to the signal constellation at the time of transmission, as illustrated in FIG. 3D. In FIG. 3D, this state is represented as any rotation of the equator plane (the hatched part). Therefore, the polarization multilevel coherent optical receiver 143 is provided with the polarization state estimation circuit 144 as the mechanism for estimating the direction of the original polarization primary axes (S1, S2, and S3 illustrated as the dotted lines in the figure). Further, another difference is in that the multilevel signal decision circuits 132-1 and 132-2 (FIG. 1B) are replaced with a polarization multilevel decoder 145 (FIG. 4B). The polarization multilevel decoder 145 recovers the information signals all together based on the polarization state and/or the amplitude and phase of the received constellation.

Subsequently, described will be the modulation system other than the above-described polarization multiplexing transmission system in which the polarization of the optical signal is utilized. Here, the differential polarization modulation system will be described. The differential polarization modulation system is a system to transmit the information by utilizing the change in the polarization between the received symbol and the immediately preceding symbol. For example, U.S. Pat. No. 4,831,663 discloses an example of transmitting the binary information, for example.

FIGS. 5A-5C illustrate the differential polarization modulation system. In the differential polarization modulation system, as illustrated in FIG. 5A, the transmission is made so as to alternatively switch two orthogonal polarizations. FIG. 5B is a view illustrating the state transition mapped on the Poincare sphere. In this system, the digital information "1" is transmitted at the time when the polarization is switched, while the digital information "0" is transmitted at the time when the polarization is unchanged. Therefore, the receiver supporting the system demodulates the received symbol by the coherent heterodyne detection of the received differential polarization modulation light, detects the change in the phase or the amplitude by calculating the product or the difference of the received symbol and the immediately preceding symbol, and demodulates the information signal based on the detection result. The differential polarization modulation system is able to transmit the information without requiring the strict detection of the polarization state, and has advantage that it is unlikely to be subjected to the impairment even in the transmission path where the polarization state changes rapidly.

Further, J. Blaikie, etc., "Multilevel Differential Polarization Shift Keying", IEEE TRANSACTIONS ON COMMUNICATIONS, VOL. 45, NO. 1, January 1997 proposes the differential polarization multilevel system in which the number of levels is increased. In general, in the high order differential polarization modulation, there remains uncertainty in deriving, from the polarization state S(n−1) of the immediately preceding symbol only, the change of the polarization state to the polarization state S(n). This is because the rotation of the Poincare sphere in the transition from S(n−1) to S(n) is not uniquely determined. Thus, the system disclosed in J. Blaikie, etc., "Multilevel Differential Polarization Shift Keying", IEEE TRANSACTIONS ON COMMUNICATIONS, VOL. 45, NO. 1, January 1997 also utilizes the polarization state S(n−2) that is two symbols preceding in the past. In this system, a rule is defined that the same polarization or the mutually orthogonal polarizations are not transmitted in consecutive two symbols. Two decision variables d1(n) and d2(n) used in the receiver supporting the system are defined as the following equation (8) in J. Blaikie, etc., "Multilevel Differential Polarization Shift Keying", IEEE TRANSACTIONS ON COMMUNICATIONS, VOL. 45, NO. 1, January 1997.

$$d1(n)=S(n)S(n-2)/(|S(n)||S(n-2)|) \quad \text{(Equation 1)}$$

$$d2(n)=S(n)S(n-1)\times S(n-2)/(|S(n)||S(n-1)\times S(n-2)|) \quad \text{(Equation 2)}$$

Here, d1(n) is a normalized inner product of S(n) and S(n−2), and d2(n) is a normalized inner product of S1 and a normalized outer product vector of S(n−1) and S(n−2).

FIGS. 6A-6E illustrate the principle of the multilevel differential polarization modulation. FIG. 6A illustrates a positional relationship among three symbols S(n−2), S(n−1), and S(n) that have been received consecutively in time. The d1 provided by Equation 1 is a coordinate value of the received symbol S(n) measured along the D1 axis that passes the Origin and S(n−2) as illustrated in FIG. 6B. In the case of this example, S(n) is on the surface of d1=0. Therefore, d1=0.

On the other hand, d2 provided by Equation 2 is a normalized inner product measured along the D2 axis (the axis parallel to the outer product vector S(n−1)×S(n−2), that is, orthogonal to both S(n−1) and S(n−2)) as illustrated in FIG. 6C. In the case of this example, S(n) is just on the D2 axis and thus d2=1.

As illustrated in FIG. 6C, the D1 axis and the D2 axis both pass the Origin of the sphere and are not parallel to each other. Therefore, the position S(n) of the received symbol can be determined uniquely to the coordinates (d1, d2). As described above, the d1 axis and the d2 axis are defined from the positions of two symbols and it is therefore confirmed that (d1, d2) is a differential demodulation result with respect to the positions for past two symbols. Such multilevel differential modulation is useful, in particular, for the case where the number of the signal points is increased for the improved transmission efficiency in the polarization multilevel transmission.

Typically, in the polarization multilevel modulation system, when the number of the signal points is increased (when a large number of signal points are densely arranged on the two-dimensional Poincare sphere surface), the correct decision of the signal point will be impossible even with a slight inclination of the Poincare sphere (even with a slight rotation of the polarization primary axis). Further, in the polarization multilevel modulation system, the increased number of the signal points makes it quite difficult to detect the primary axis or track the change in the primary axis after the reception. In particular, when the degradation of the SN is larger or when a rapid fluctuation is generated in the polarization state, the error in the detection of the polarization axis or in the tracking occurs, which makes the reception impossible.

In contrast, in the case of the above-described differential multilevel polarization modulation system, the symbol decision is made based on the difference and the like in the polarization between two consecutively received symbols, so that the accurate and fast polarization tracking is not required and thus the strength against the fast polarization fluctuation is improved.

SUMMARY OF THE INVENTION

However, the existing differential polarization modulation systems have the following problems.

One of the problems is in the degradation of the reception sensitivity due to the increased noise. In the differential polarization modulation, the polarization state of the past symbol received in the immediate past is used as the reference point and the information is transmitted based on the change amount of the polarization state with respect to that reference point.

In the long-distance optical fiber transmission, however, when the optical SNR is reduced due to the influence of the noise and the like of the optical amplifier located in the way of the transmission path, the fluctuation of the polarization state is superimposed independently to the polarization states S(n−1) and S(n−2) of the past symbols that are to be the reference points and the current received symbol S(n) that is to be measured, respectively. The influence when there is a noise as discussed above is illustrated in FIG. 5C. FIG. 5C illustrates the influence of the noise in the binary differential polarization modulation. In the figure, S0(n) and S0(n−1) represent the ideal positions of the signal points. Further, the ranges within which the polarization states of the signal points fluctuate are represented by small circles (depicted with hatching) having their centers at the ideal signal points.

For example, it is assumed that, affected by the noise, the polarization states of the signal points S(n) and S(n−1) fluctuate to be closer to each other such as S(n) and S(n−1). In such the case, the change in their polarization states is measured and found to be shorter by twice the noise amount. As a result, the optical SNR sensitivity degraded by approximately 3 dB. In this case, the possible transmission distance is expected to be reduced to approximately half compared to the case of the typical binary polarization modulation.

Further, FIG. 6D represents an example of the differential multilevel polarization modulation in the case where there is no influence of the optical noise, and FIG. 6E represents an example of the differential multilevel polarization modulation the case where there is an influence of the optical noise. Without the influence of the noise, the received symbols provided by S0(n−2), S0(n−1), and S(n) first move along the equator on the 90-degree sphere surface as illustrated in FIG. 6D and then move along the line of longitude on the 90-degree sphere surface.

In contrast, with the influence of the noise, the shape of the transition significantly changes as illustrated in FIG. 6E. In the case of the example of FIG. 6E, the moving track is approximately a curve. In fact, also in J. Blaikie, etc., "Multilevel Differential Polarization Shift Keying", IEEE TRANSACTIONS ON COMMUNICATIONS, VOL. 45, NO. 1, January 1997, it is reported that, in the theoretical sensitivity of the binary differential polarization modulation, the SNR sensitivity is degraded by 2.4 dB compared to the binary polarization modulation and, in the theoretical sensitivity of the six-value differential polarization modulation, the SNR sensitivity is degraded by 5.4 dB compared to the binary polarization modulation.

Another problem is that the equation of the decision coefficient and/or the identification value will change depending on the position of the signal points or the number of the signal points caused by the differential multilevel polarization modulation. Although J. Blaikie, etc., "Multilevel Differential Polarization Shift Keying", IEEE TRANSACTIONS ON COMMUNICATIONS, VOL. 45, NO. 1, January 1997 newly introduces the decision coefficients such as d1 and d2 for detecting the change in the polarization plane, it is quite troublesome to separately search the appropriate decision variables according to the number of and/or the arrangement of the signal points. Furthermore, when the appropriate decision variable is not taken, the performance such as the reception sensitivity is likely to be significantly degraded. Further, the number and/or the equation of the decision variable is likely to change according to the positional relationship of the immediately preceding signal point S(n−1) and the signal point S(n) and it is thus necessary to provide redundant calculation and decision circuit in the implementation to the actual receiver. Moreover, the decision error in the immediately preceding symbol causes the error in the decision equation and circuit utilized for the decision of the subsequent symbol, which is likely to causes a chain of errors.

Herein, there is provided a plurality of aspects of the invention to solve the above problems. An example thereof is an optical polarization multilevel signal receiving apparatus including a polarization multilevel receiver configured to be input, from an optical transmission path, with a polarization multilevel signal light in which a plurality of polarization states is switched for every fixed symbol time and to calculate a decision variable corresponding to a change in a received polarization state for every symbol time to decode transmission information.

Here, where R is a received symbol and A is at least one past symbol used as a reference for a change, the polarization multilevel receiver generates at least one estimation symbol A1 to AN for estimating a state of the symbol A by utilizing a polarization state of at least one polarization multilevel symbol received in a past before the symbol A, a past value of a decision variable, and a decision result, averages the estimation symbols A1 to AN and the symbol A to calculate a reference symbol Ar, and uses the calculated reference symbol Ar in place of the symbol A to calculate a decision variable corresponding to a change in a polarization state of the received symbol R.

The present invention allows for the reduction in the degradation of the SNR sensitivity that may be generated in the reception of the polarization multilevel signal light. The object, configuration, and advantage other than has been described above will be apparent by the following description of the embodiments.

DESCRIPTION OF THE PREFERRED EMBODIMENTS

Embodiments of the present invention will be described below based on the drawings. It is noted that the present invention is not limited to the embodiments described later, and various modification are possible within the scope of its technical concept.

First Embodiment

Figure 7:
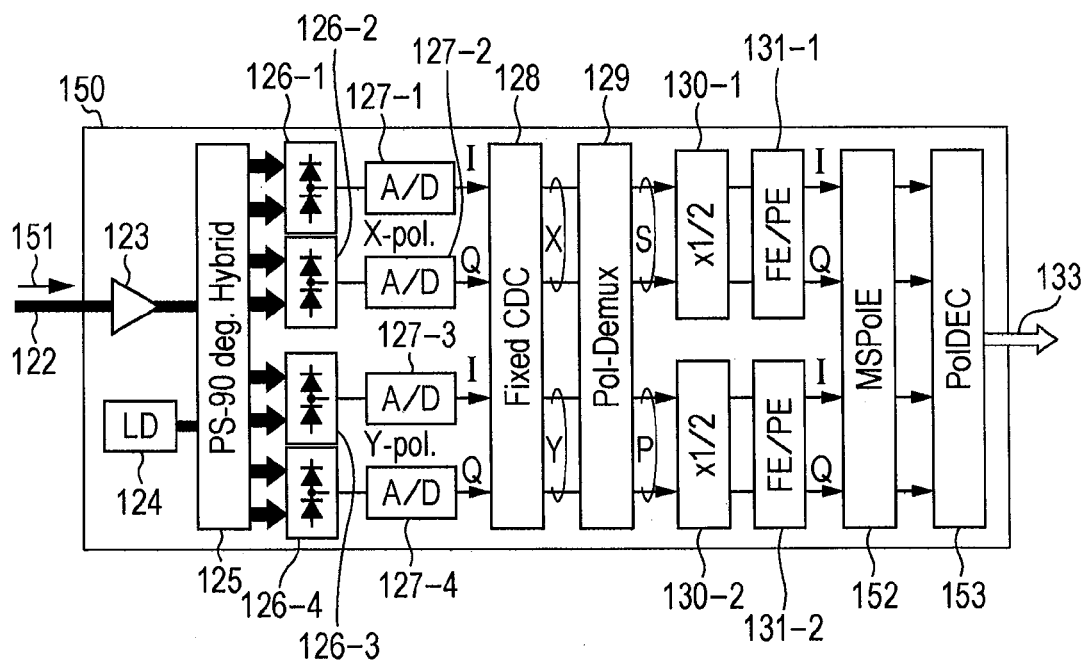
FIG. 7 is a diagram illustrating a configuration of a digital coherent differential polarization multilevel optical receiving apparatus according to a first embodiment.

FIG. 7 illustrates a configuration of a digital coherent differential polarization multilevel optical receiver 150 according to the first embodiment. A differential polarization multilevel signal 151 is input to the digital coherent differential polarization multilevel optical receiver 150 from an input optical fiber 122. The digital coherent differential polarization multilevel optical receiver 150 has substantially the same configuration as the conventional differential polarization multilevel receiver.

That is, the digital coherent differential polarization multilevel optical receiver 150 is configured with an optical amplifier 123 connected to the input optical fiber 122, a local oscillation laser source 124, a polarization splitting optical 90-deg. hybrid circuit 125, balance optical receivers 126-1 to 126-4, AD converters 127-1 to 127-4, a semi-fixed dispersion compensation circuit 128, a polarization beam splitter 129, sampling circuits 130-1 and 130-2, frequency and phase estimation circuits 131-1 and 131-2, a multi-symbol polarization estimation circuit 152, and a multilevel decision circuit 153.

The receiver according to the embodiment differs from the conventional example in that the multi-symbol polarization estimation circuit 152 is inserted immediately before the multilevel decision circuit 153. The multi-symbol polarization estimation circuit 152 functions to use the value of the decision variable of the past several symbols and the decision result to average and remove the noise components included in the polarization state of the past several symbols. Addition of the circuit allows the receiver of the present embodiment to derive a new decision variable with a higher accuracy compared to the conventional example.

Described below will be the case where an optical signal conforming to the differential polarization multilevel modulation system is input to the digital coherent differential polarization multilevel optical receiver 150 via the input optical fiber 122.

The multi-symbol polarization estimation circuit 152 of the present embodiment calculates the decision variables d1r(n) and d2r(n) in which the noise has been reduced. The decision variables d1r(n) and d2r(n) are provided as the following Equation 3 and Equation 4.

$$d1r(n)=S(n)\cdot Sr(n-2)/|S(n)| \quad \text{(Equation 3)}$$

$$d2r(n)=S(n)\cdot Sr(n-1)\times Sr(n-2)/|S(n)| \quad \text{(Equation 4)}$$

The decision variables d1r(n) and d2r(n) of the present embodiment are associated with the conventional decision variables d1(n) and d2(n). The decision variables d1r(n) and d2r(n) of the present embodiment are different from the conventional system in that the averaged symbol positions Sr(n−1) and Sr(n−2) are used.

The averaged symbol positions Sr(n−1) and Sr(n−2) proposed in the present embodiment are those in which the noises included in the past symbol positions S(n−1) and S(n−2) have been reduced. In the following description, for each averaged symbol position Sr(n), it is assumed that its amplitude has been normalized to "1".

Further, although the conventional system directly utilizes the received polarization state detected in the past as the one-symbol preceding received symbol S(n−1), the multi-symbol polarization estimation circuit 152 utilizes the further past decision result to estimate the one-symbol preceding received symbol S(n−1) and uses the estimated result for the calculation of the averaged symbol position.

Hereafter, D1(n) and D2(n) are the results (decision results) of the identification decision for the decision variables d1r(n) and d2r(n). This is because the past decision results D1(n−1) and D2(n−1) are the results from the use of further past symbol positions S(n−2) and S(n−3) as the references and the estimation of the change in the polarization state up to S(n−1). Then, it can be estimated that S(n−1) exists in the coordinate D1(n−1) on the d1 axis (S(n−3) axis) and exists in the coordinate D2(n−1) on the d2 axis (S(n−2)×S(n−3) axis).

In this case, the position S(n−1)r_1 of S(n−1) estimated using S(n−2) and S(n−3) can be derived by the following Equation 5.

$$S(n-1)r\_1=\mathrm{Unit}(D1(n-1)*S(n-3)+D2(n-1)*S(n-3)\times S(n-2)) \quad \text{(Equation 5)}$$

Here, Unit ( ) represents a function to normalize the amplitude to "1", and "_1" represents the polarization state that is estimated from the symbol position traced back to the past by one. Similarly, S(n−2), Sr(n−3), . . . Sr(n−i) are also defined sequentially as follows.

$$S(n-2)r\_1=\mathrm{Unit}(D1(n-2)*S(n-4)+D2(n-2)*Sr(n-4)\times S(n-3)) \quad \text{(Equation 6)}$$

$$S(n-3)r\_1=\mathrm{Unit}(D1(n-3)*S(n-5)+D2(n-3)*Sr(n-5)\times S(n-4)) \quad \text{(Equation 7)}$$

. . .

$$S(n-i)r\_1=\mathrm{Unit}(D1(n-i)*S(n-i-2)+D2(n-i)*Sr(n-i-2)\times S(n-i-1)) \quad \text{(Equation 8)}$$

For example, by substituting S(n−2)r_1 of Equation 6 for S(n−2) of Equation 5, the following equation can be obtained that estimates S(n−1) using the further preceding polarization states S(n−3) and S(n−4).

$$S(n-1)r\_2=\mathrm{Unit}(D1(n-1)*S(n-3)+D2(n-1)*Sr(n-4)\times S(n-1)r\_1) \quad \text{(Equation 9)}$$

Further, by sequentially substituting Equation 7 to Equation 8 for Equation 9 with increasing i for one by one and replacing S(n−i) with S(n−i)r_1, a number of estimation values S(n−1)r_1, S(n−1)r_2, . . . S(n−1)r_k for S(n−1) can be obtained.

These are the estimation values for S(n−1) calculated by using polarization states obtained at past different times (precisely, consecutive two times, i, i−1). It is noted that, because the values have noise components, their positions are averaged up to past k positions to obtain the polarization state Sr(n−1) in which the noise is reduced, as illustrated in Equation 10.

$$Sr(n-1)=\mathrm{Unit}(S(n-1)+S(n-1)r\_1+S(n-1)r\_2+\ldots S(n-1)r\_k) \quad \text{(Equation 10)}$$

Similarly, the position of S(n−2) can be estimated as Equation 11.

$$Sr(n-2)=\mathrm{Unit}(S(n-2)+S(n-2)r\_1+S(n-2)r\_2+\ldots S(n-2)r\_k) \quad \text{(Equation 11)}$$

In reality, however, the observation time is shifted only by one symbol between Equation 10 and Equation 11. Therefore, Sr(n−2) may be the one derived by timing-delaying the calculation result of Equation 10 by one symbol. The values d1r(n) and d2r(n) resulted by substituting Sr(n−1) and Sr(n−2) obtained in such a way into Equation 3 and Equation 4 are the novel decision variables according to the present embodiment.

Figure 8:
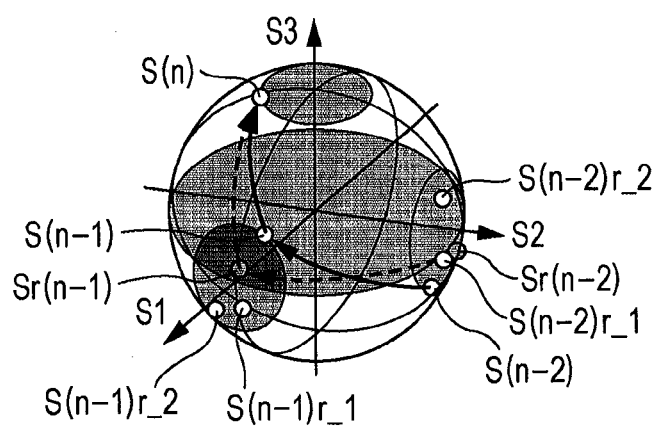
FIG. 8 is a view illustrating an estimation principle of a polarization state according to the first embodiment.

FIG. 8 represents an outlook of the estimation of the polarization state according to the present embodiment by using the Poincare sphere. FIG. 8 illustrates a situation of Sr(n−1) and Sr(n−2) (two points in gray in the figure) estimated by Equation 10 and Equation 11.

Figure 6A:
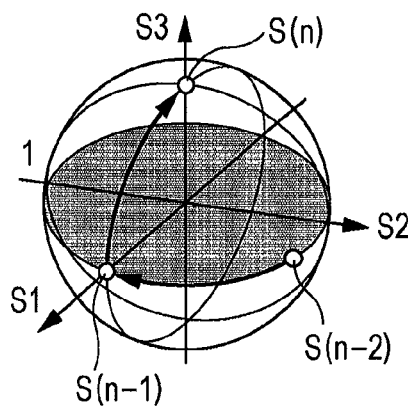
FIGS. 6A, 6B, 6C, 6D and 6E are views illustrating a principle of the multilevel differential polarization modulation.
Figure 6B:
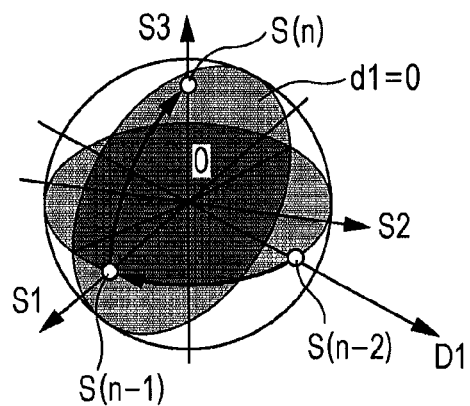
Figure 6C:
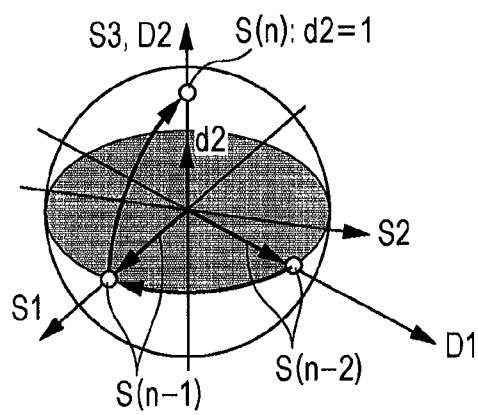
Figure 6D:
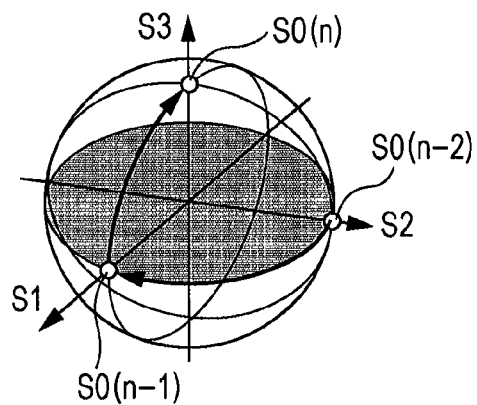
Figure 6E:
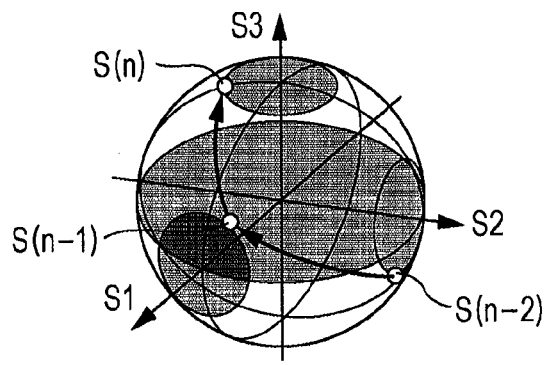

For example, Sr(n−1) is resulted by averaging S(n−1)r_1, S(n−1)r_2, and so on estimated from the past received polarization states in addition to the polarization state S(n−1) that is actually received, and comes closer to the true position of the signal point (S0(n−1)) illustrated in FIG. 6D. Therefore, the noise is more reduced allowing for a highly accurate signal decision compared to the case where the received polarization states S(n), S(n−1), and S(n−2) are directly used.

It is noted that the digital coherent differential polarization multilevel optical receiver 150 illustrated in FIG. 7 employs the configuration for once recovering the polarization state of the transmitting side at the polarization beam splitter 129. In principle, however, since the differential polarization modulation extracts the change in polarization, it is not necessarily required to have the polarization beam splitter 129 within the receiver.

In the conventional digital coherent receiver, however, the polarization beam splitter 129 is usually realized with the general-purpose adaptive butterfly FIR (Finite Impulse Response) filter based on an simple algorithm such as the CMA (constant Modulus Algorithm) and, at the same time as the polarization splitting, is utilized for equalizing the linear degradation such as the residual chromatic dispersion and polarization dispersion of the transmission path.

Therefore, in the present invention, the polarization beam splitter 129 is installed in the digital coherent differential polarization multilevel optical receiver 150 to compensate the degradations, as illustrated in FIG. 7. However, not limited to the polarization beam splitter 129, some adaptive equalizer circuit against the transmission impairment may be installed.

Further, although FIG. 7 illustrates the configuration of the receiver configured to receive the received signal in a digital coherent manner and detects the polarization state, the optical receiver based on other operation principle may be used as long as it has the function of detecting the polarization state. For example, the Stokes parameter detector, which splits the received signal into three and inputs respective signals to the direct detection receiver having the function of detecting three Stokes parameters S1, S2, and S3, may be used as a receiver. Such Stokes parameter detector is widely used in the field of optical measurement as a polarimeter configured to detect the polarization state of the optical signal.

Second Embodiment

Figure 9:
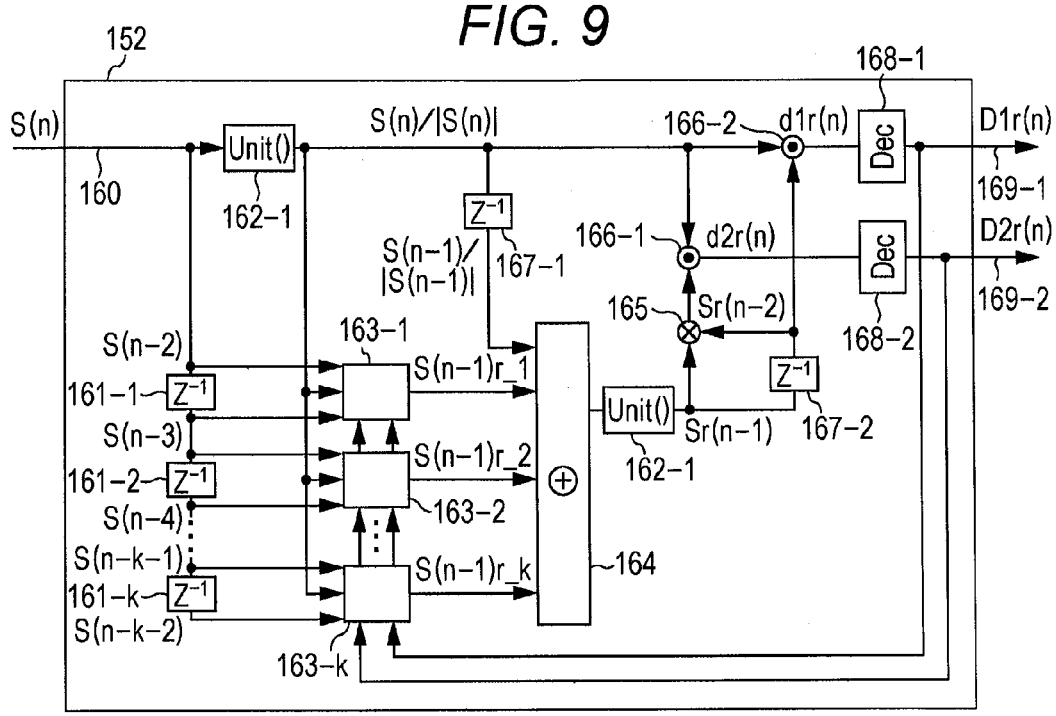
FIG. 9 is a diagram illustrating a configuration of a multi-symbol polarization estimation circuit 152 according to a second embodiment.

FIG. 9 is a diagram illustrating an example of the configuration of the multi-symbol polarization estimation circuit 152. The received polarization state S(n) is input to the multi-symbol polarization estimation circuit 152 as a polarization state input 160. The polarization state S(n) is sequentially delayed at the symbol delay circuits 161-1, 161-2, . . . 161-k. Each of the symbol delay circuits 161-1, 161-2, . . . 161-k outputs each input symbol and output symbol to each of corresponding polarization state estimation circuits 163-1 to 163-k. For example, the polarization state estimation circuits 163-1 and 163-2 are implemented with the calculation circuits corresponding to Equation 8 and Equation 9 to obtain the estimation value S(n−1)r_i of the polarization state at the time n−1 based on the past two polarization states and the decision results D1 and D2. As described as Equation 10, the values are added with the normalized result of S(n−1) at the polarization state averaging circuit 164 and, then, they are adjusted so that the amplitude is constant at a normalizing circuit 162-1 to have the reference symbol Sr(n−1).

A delay circuit 167-2, inner product circuits 166-1 and 166-2, and an outer product circuit 165 are circuits configured to derive the decision variables d1r(n) and d2r(n) from the reference symbol Sr(n−1) and the normalizing received symbol S(n)/|S(n)| according to Equation 3 and Equation 4.

Decision circuits 168-1 and 168-2 are circuits configured to determine the decision variables d1r(n) and d2r(n) and output the decision results D1(n) and D2(n) of the differential polarization demodulation, respectively.

It is noted that, although the number of the utilized past polarization states is k in this example, k may range any number as long as it is greater than one. According to the statistics, k within the range of 3 to 20 provides sufficient amount of the sensitivity improvement. As illustrated in the present configuration diagram, the multi-symbol polarization estimation circuit 152 can be relatively easily implemented using the digital vector calculation.

Third Embodiment

Figure 10:
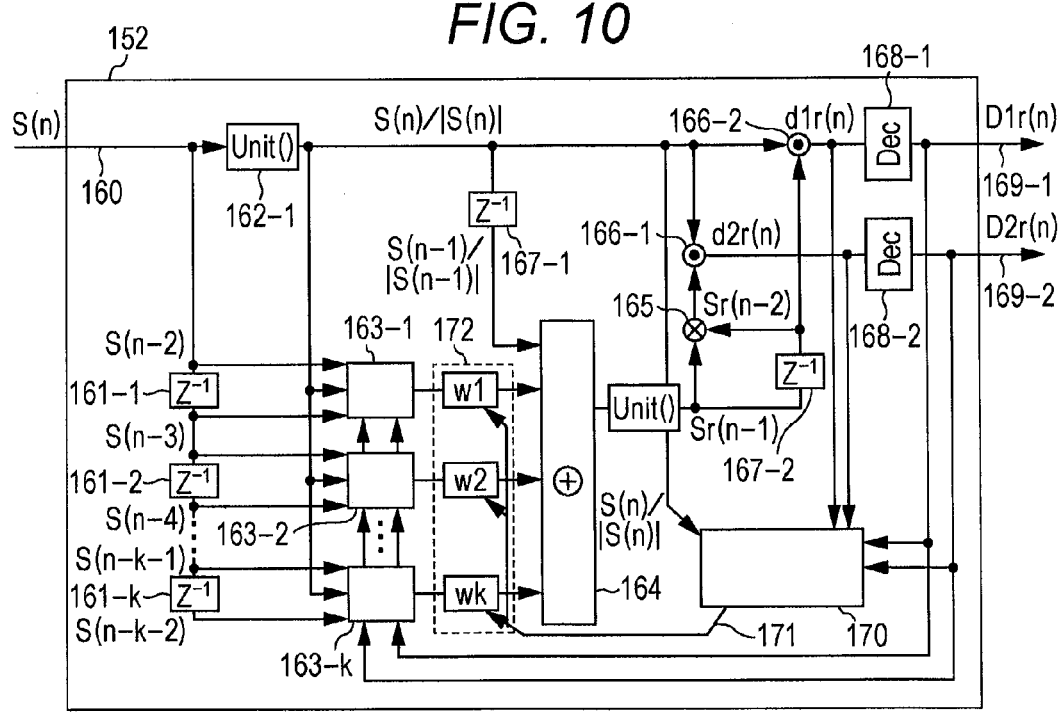
FIG. 10 is a diagram illustrating a configuration of a multi-symbol polarization estimation circuit 152 according to a third embodiment.

FIG. 10 illustrates another example of the configuration of the multi-symbol polarization estimation circuit 152. In FIG. 10, the same reference numerals as in FIG. 9 are provided to the corresponding parts. The difference between the present embodiment and the second embodiment is in the presence or absence of a weighting circuit 172 configured to provide weighting in averaging the estimated polarization states and an optimum weighting calculation circuit 170.

Generally, utilizing the past information to estimate the polarization state will cause an increased error. Therefore, it is not optimal to add, at the same ratio, the output polarization states of the polarization state estimation circuits 163-1, 163-2 to 163-k. Thus, addition is made in such a manner that the greater weight is provided to the newer data, so that the polarization state can be estimated with high quality.

The optimum weighting calculation circuit 170 of the present embodiment is input with the decision variables d1 and d2, their decision results D1 and D2, the received polarization state S(n), and the like, and outputs a weighting signal 171 to optimize weighting variables w1 to wk of the weighting circuit 172 so that the decision error is minimized. For the algorithm for such optimization, the LMS (Least Mean Square error) and the like can be utilized that is widely used for the optimization of the digital filter in the field of communications.

It is noted that, while the example of applying the adaptive optimum weighting has been illustrated in the present embodiment, the weights w1 to wk may be set to fixed values or may be adjusted manually. Further, although the normalizing circuit is inserted as needed to maintain the amplitude value in constant in the present embodiment, it may be appropriately omitted when the calculation result is equalized.

Further, when the received polarization multilevel signal S(n) has the amplitude modulation component, the magnitude of the amplitude may be reflected to S(n−1) and the polarization state estimation values S(n−1)r_1, S(n−1)r_2, . . . S(n−1)r_k. Thereby, at the weighting addition, the estimation value estimated utilizing the past symbol having the larger amplitude is added with the larger amplitude. As a result, the symbol with the larger amplitude having less noise is prioritized in the estimation, so that the noise can be further reduced.

Fourth Embodiment

Described here will be an example of the differential polarization multilevel optical transmitter used as a pair with the above-described digital coherent differential polarization multilevel optical receiver 150.

Figure 1A:
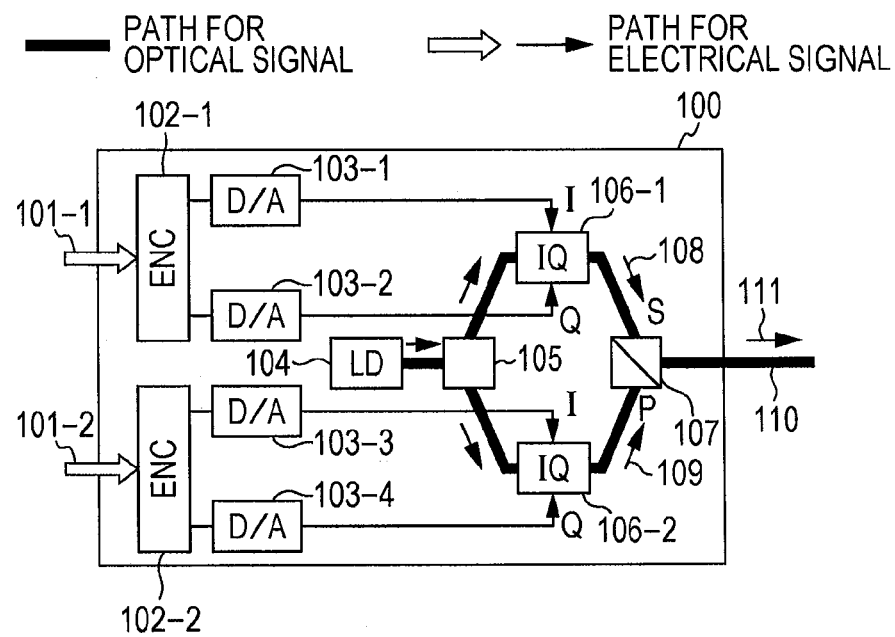
FIGS. 1A and 1B are diagrams illustrating configuration of a digital coherent polarization multiplexing transmission system according to the prior art.
Figure 1B:
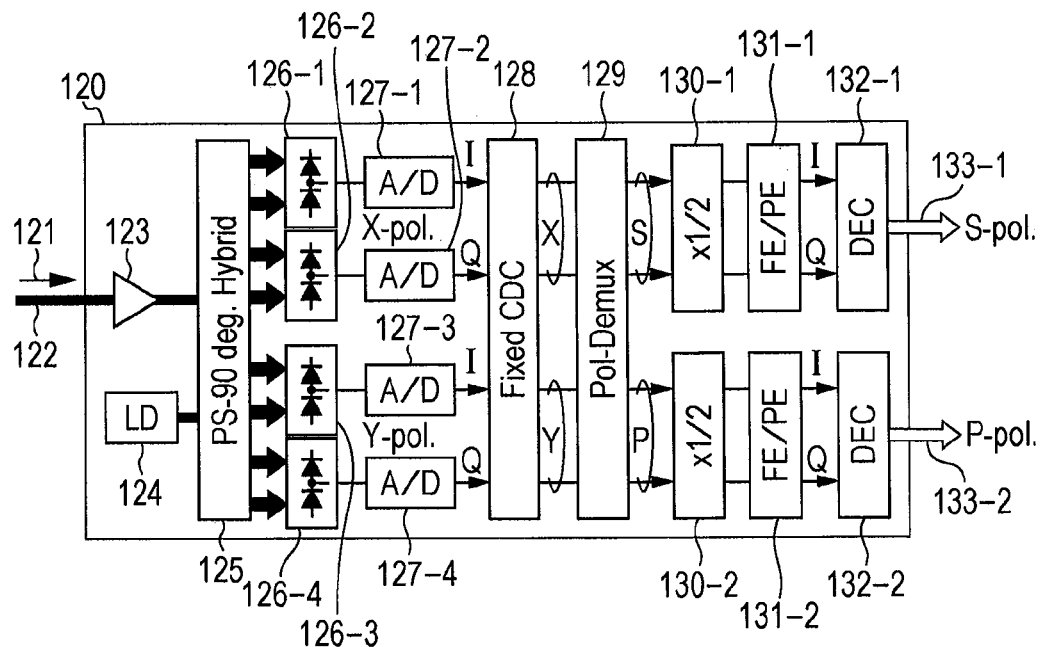
Figure 2A:
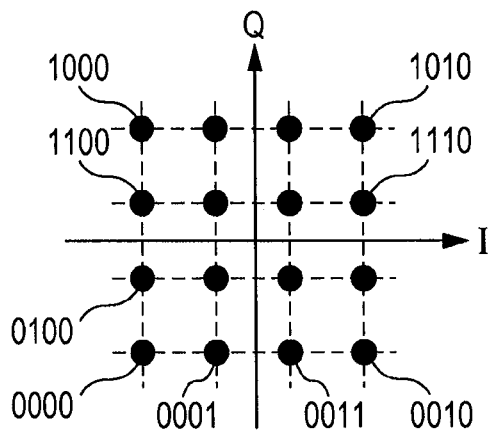
FIGS. 2A and 2B are views illustrating an optical multilevel modulation and a polarization multiplexing applicable to optical fiber communications according to the prior art.
Figure 2B:
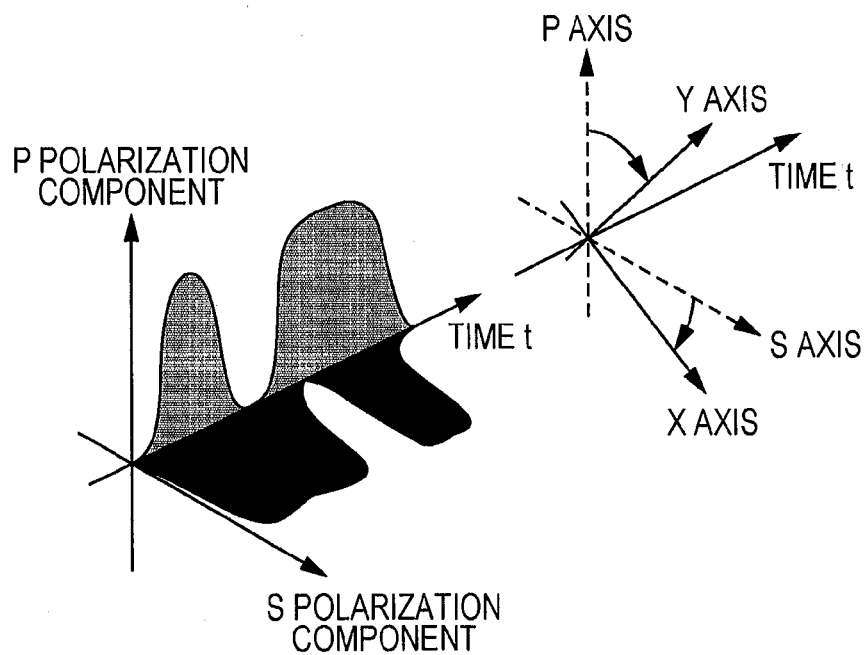
Figure 3A:
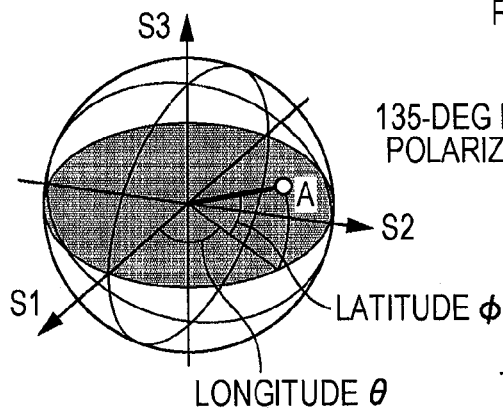
FIGS. 3A, 3B, 3C and 3D are views illustrating polarization states of optical signals and a polarization multilevel modulation according to the prior art.
Figure 3B:
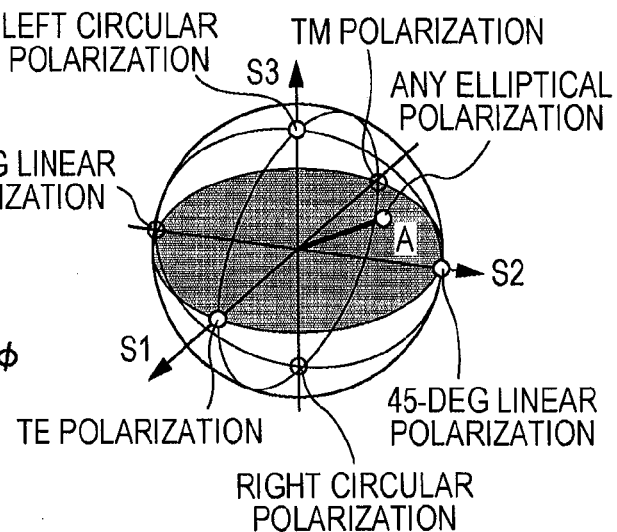
Figure 3C:
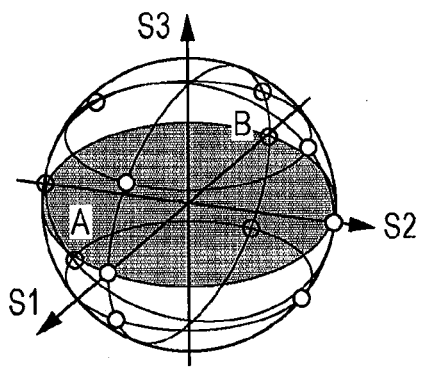
Figure 3D:
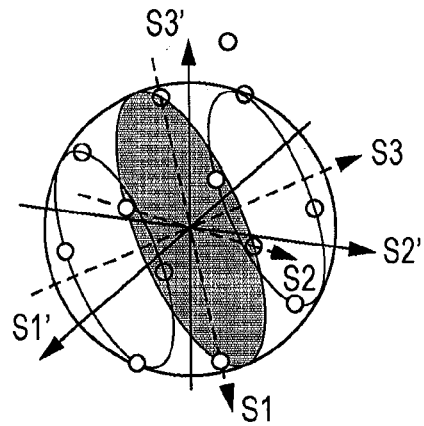
Figure 4A:
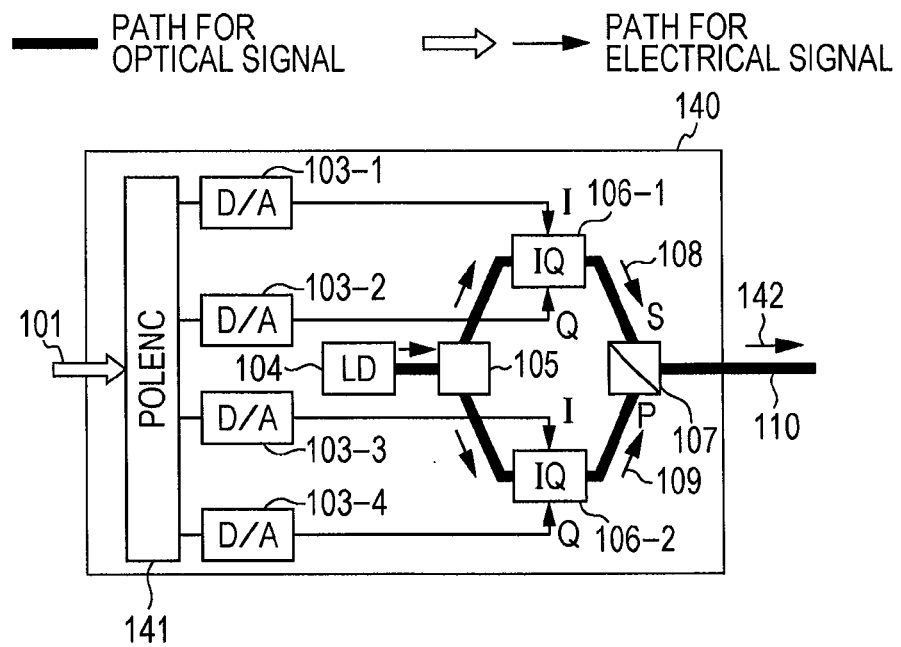
FIGS. 4A and 4B are diagrams illustrating configuration of a digital coherent polarization multilevel transmission system according to the prior art.
Figure 4B:
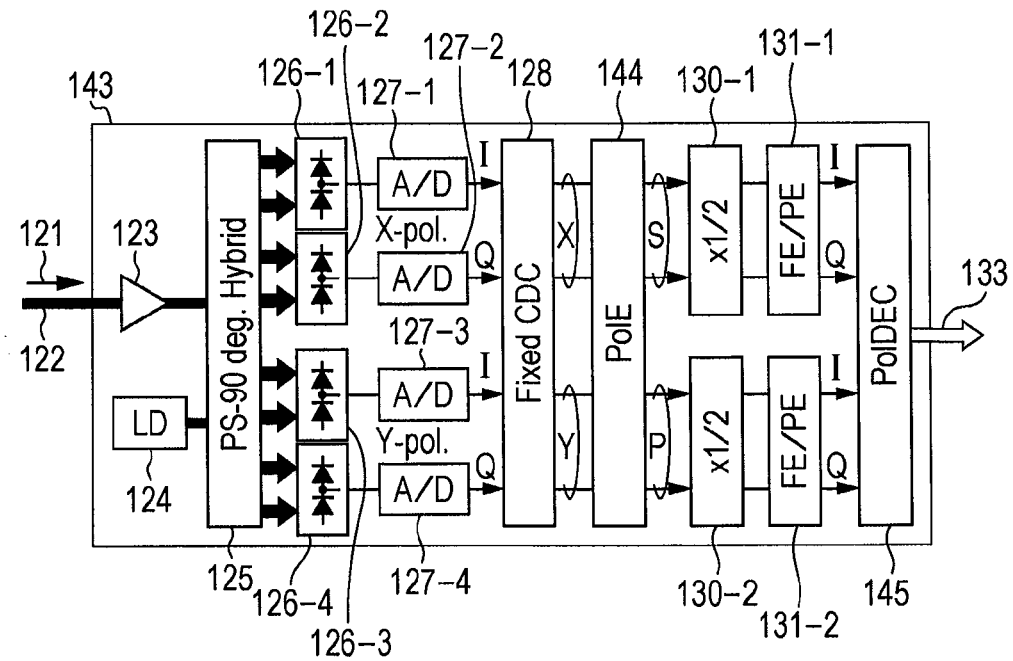
Figure 5A:
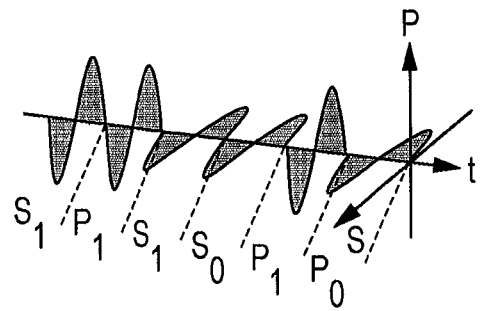
FIGS. 5A, 5B and 5C are views illustrating a principle of the binary differential polarization modulation.
Figure 5B:
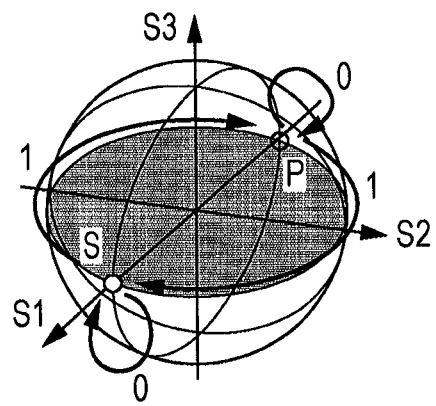
Figure 5C:
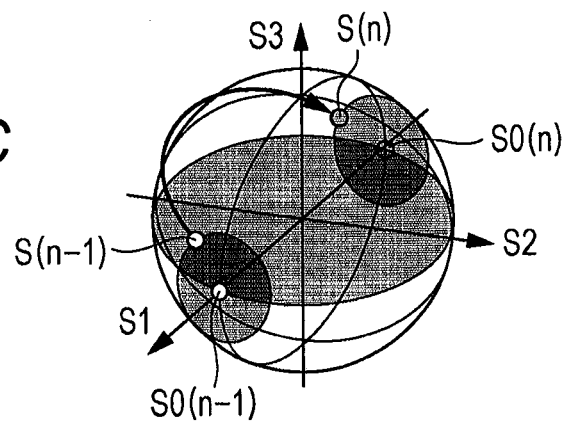
Figure 11:
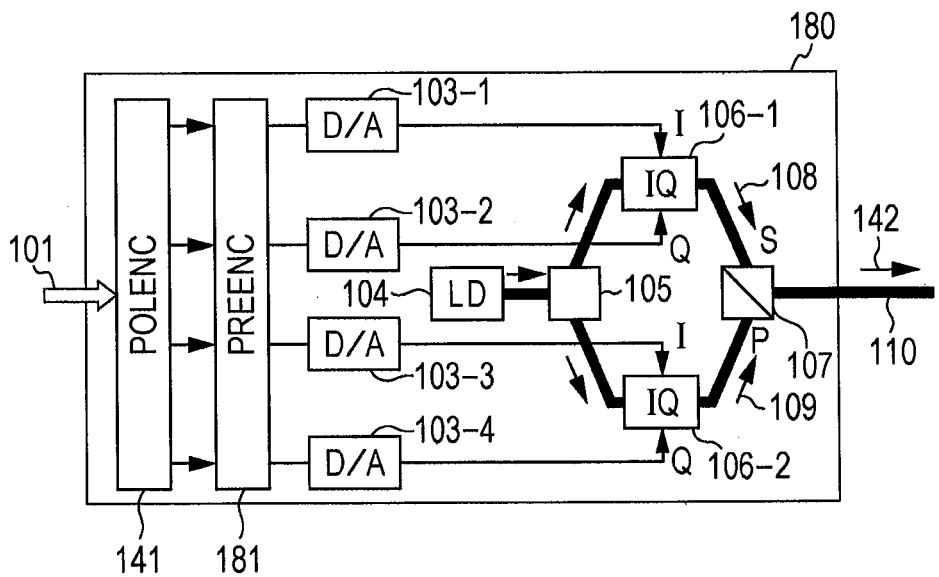
FIG. 11 is a diagram illustrating a configuration of a differential polarization multilevel optical transmitter 180 according to a fourth embodiment.

FIG. 11 is a diagram illustrating the configuration of a differential polarization multilevel optical transmitter 180 according to the present embodiment. In FIG. 11, the same reference numerals as in FIG. 4 are provided to the corresponding parts.

The differential polarization multilevel optical transmitter 180 is configured with a polarization multilevel encoder (POLENC) 141, a differential polarization precoding circuit 181, D/A converters 103-1 to 103-4, a transmission laser source 104, an optical splitter 105, a quadrature optical field modulators 106-1 and 106-2, and a polarization multiplexing circuit 107. The present embodiment is featured in that the differential polarization precoding circuit 181 is provided immediately after the polarization multilevel encoder 141. However, the differential polarization multilevel optical transmitter that is used as a pair with the digital coherent differential polarization multilevel optical receiver 150 is not limited to the configuration illustrated in FIG. 11.

Figure 12:
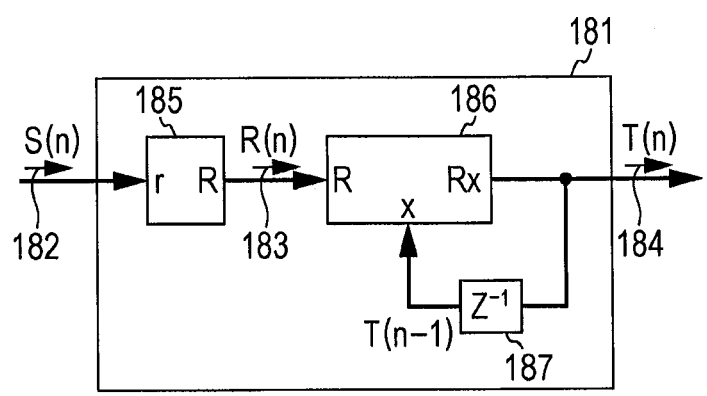
FIG. 12 is a diagram illustrating a configuration of a differential polarization precoding circuit 181 used in the transmitter according to the fourth embodiment.

FIG. 12 is a schematic diagram of the differential polarization precoding circuit 181. The differential polarization precoding circuit 181 is input with a polarization multilevel signal 182 generated by the polarization multilevel encoder 141 sequentially one symbol by one symbol. Here, S(n) means the polarization multilevel signal 182 of the symbol number n. The polarization multilevel signal 182 is a multi-dimensional amount corresponding to the polarization state expressed with the digital value. Any indication form may be useful as long as it can be associated with any polarization state, that is, a point on the Poincare sphere, and it can be indicated by a three-dimensional Stokes vector, a complex Jones vector, a pair of the longitude and latitude on the Poincare sphere, for example.

S(n) is input to a rotation matrix conversion circuit 185 and output as R(n) associated by one on one with each polarization state on the Poincare sphere, that is, a polarization rotation matrix 183. The polarization rotation matrix 183 is a conversion matrix that indicates the rigid body rotation conversion on the Poincare sphere surface. For example, when the Stokes vector is used for expressing S(n), S(n) will be a three-element column vector and R(n) will be a 3×3 Stokes matrix.

The polarization rotation matrix 183 (R(n)) is input to a polarization rotation calculation circuit 186. The polarization rotation calculation circuit 186 multiplies the polarization rotation matrix 183 (R(n)) by a polarization state T(n−1) input from another terminal and outputs T(n) (=R(n)T(n−1)) as a polarization precoding signal 184.

At the same time, T(n) is timing-delayed by one symbol at one-symbol delay circuit 187 and fed back to the input terminal of the polarization rotation calculation circuit 186 again as the one-symbol preceding T(n−1). Thereby, the output signal T(n) results in the one in which the polarization rotation matrix R(n) is applied in a sequential and accumulative manner.

Described below will be the differential polarization encoding and the differential polarization decoding performed in the transmission system in which the differential polarization multilevel optical transmitter 180 of the present embodiment is used for the transmitter and the digital coherent differential polarization multilevel optical receiver 150 is used for the receiver.

Figure 13A:
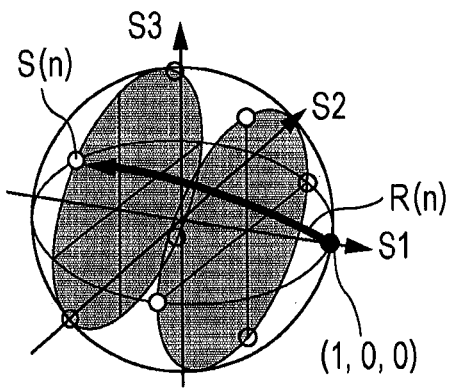
FIGS. 13A, 13B and 13C are views illustrating an operation of a differential polarization coding and a differential polarization decoding according to the fourth embodiment.
Figure 13B:
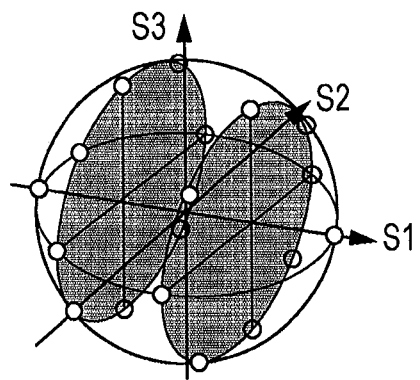
Figure 13C:
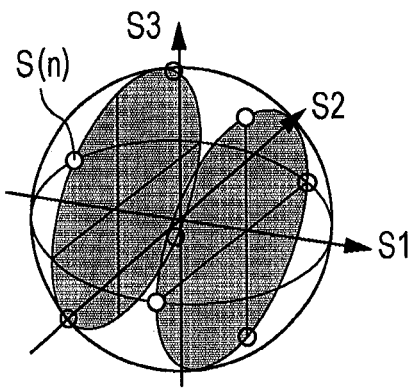

The diagrams of FIG. 13A-C illustrate an example of the operation of the rotation matrix conversion circuit 185. The white circles in FIG. 13A form the signal constellation of S(n) input to the rotation matrix conversion circuit 185. FIG. 13A illustrates an example of the eight-level polarization multilevel modulation in which eight signal points are arranged substantially evenly on the Poincare sphere. S(n) is located at any one of the points of the white circles for each one symbol.

When input with S(n), the rotation matrix conversion circuit 185 outputs the polarization rotation matrix 183 that causes the black circle (the point of coordinates (S1, S2, S3)=(1, 0, 0)) in the figure to rotate to S(n), for example. The polarization rotation matrix 183 for achieving such rotation is not limited to one matrix. For example, considered is the rotation matrix that causes the black circle to move to S(n) in the shortest distance along a large circle passing the black circle and S(n) such as the large circle illustrated with the gray line in the figure. Besides, considered is the combination matrix of the rotation matrix providing a rotation with respect to S3 as an axis and a rotation with respect to S1 as an axis.

The output polarization rotation matrix 183 (R(n)) is input to the polarization rotation calculation circuit 186. The polarization rotation calculation circuit 186 multiplies the polarization rotation matrix 183 (R(n)) by the polarization state T(n−1) input from another terminal and outputs T(n) (=R(n)T(n−1)) as the polarization precoding signal 184.

At the same time, T(n) is timing-delayed by one symbol at one-symbol delay circuit 187 and fed back to the input terminal of the polarization rotation calculation circuit 186 again as the one-symbol preceding T(n−1). Thereby, the output signal T(n) results in the one in which the polarization rotation matrix R(n) is applied in a sequential and accumulative manner. The accumulative result of the polarization rotation matrix from the time 0 to the time n is provided by the following equation.

$$T(n)=R(n)R(n-1)R(n-2)R(n-3)\ldots R(1)T(0)$$

It is noted that, since the receiving side performs the differential detection, the initial state T(0) does not matter in particular.

FIG. 13B is an example of the signal constellation of the polarization multilevel signal output from the differential polarization precoding circuit 181 and thus the differential polarization multilevel optical transmitter 180. In general, the number of the signal points increases from the input polarization multilevel signal 182 and they are converted into complicated signals.

It is noted that the necessary condition of the polarization rotation matrix 183 is that R and Q are equal, where the extracting operation of the decision variable of the receiver is expressed by Q(n) in the matrix calculation. Such condition allows for the cancellation of the differential polarization detection at the receiving side and the polarization precoding at the transmitting side. Therefore, as in FIG. 13C, the same signal constellation as in FIG. 13A can be obtained.

Figure 14:
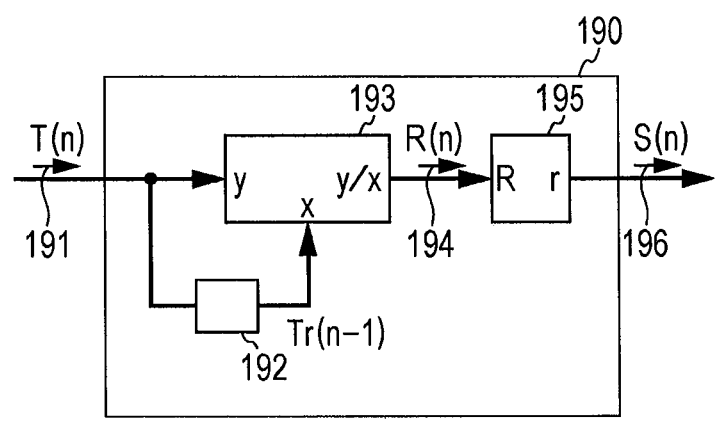
FIG. 14 is a view illustrating a configuration of a polarization differential extraction circuit 190 used in a receiver according to the fourth embodiment.

By referring to FIG. 14, described here will be the polarization differential extraction circuit 190 that is preferable when installed at the input stage of the multi-symbol polarization estimation circuit 152 of the digital coherent differential polarization multilevel optical receiver 150.

The polarization differential extraction circuit 190 is input with a polarization precoding signal 191 (T(n)) from the frequency and phase estimation circuits 131-1 and 131-2. The polarization precoding signal 191 is split into two inside the polarization differential extraction circuit 190, one of which is input as the y signal of a polarization rotation detection circuit 193. The other is input to a reference polarization estimation circuit 192. The reference polarization estimation circuit 192 averages the polarization precoding signal 191 to reduce the noise and outputs it as the estimation signal Tr(n−1) at the time n−1. The estimation signal Tr(n−1) is input as the x signal of the polarization rotation detection circuit 193.

The polarization rotation detection circuit 193 is input with two polarization vectors x and y and calculates the change in the polarization state that moves from x to y along the large circle to have the rotation conversion matrix y/x as the output signal. Here, because of the operation of the polarization precoding circuit 181 at the transmitting side, there is a relationship of y=T(n)=R(n)T(n−1). Therefore, the output signal of the polarization rotation detection circuit 193 will be R(n).

A vector conversion circuit 195 outputs the polarization state vector r that corresponds to the input polarization rotation conversion R(n) in a one on one manner. If the rotation operation of the vector conversion circuit 195 is predefined so as to be the inverse conversion of the rotation matrix conversion circuit 185 located in the transmitting side, an output polarization multilevel signal 196 is equal to the original S(n) input to the differential polarization precoding circuit 181 at the transmitting side. As a result, in the differential polarization multilevel signal, almost any polarization state can be transmitted without causing the change in the signal point or the distortion in the arrangement.

It is noted that, as the condition required to the differential polarization multilevel modulation signal, it is necessary to avoid the proximity of the point (−1, 0, 0) that is the opposite side of the point (1, 0, 0) as the reference for the rotation matrix as seen in FIG. 13A. This is because the rotation matrix from (1, 0, 0) to (−1, 0, 0) is undefined. Here, the polarization multilevel signal 196 is input to the multi-symbol polarization estimation circuit 152 illustrated in FIG. 7.

CONCLUSION

Finally, described will be the feature of the processing function of the above-described digital coherent differential polarization multilevel optical receiving apparatus 150 and the differential polarization multilevel optical transmitter 180. It is noted that, as described above, the digital coherent differential polarization multilevel optical receiving apparatus 150 (FIG. 7) does not necessarily require the presence of the differential polarization multilevel optical transmitter 180 (FIG. 11).

When the received symbol is represented by R and a plurality of past symbol strings used as the reference for the change are represented as A and B, the digital coherent differential polarization multilevel optical receiving apparatus 150 generates a plurality of estimation symbols A1 to AN and B1 to BN for estimating the states of the symbols A and B by utilizing the polarization states of a plurality of polarization multilevel symbols received in the past before the symbols A and B, the past value of the decision variable, and the decision result, averages the estimation symbols A1 to AN and the symbols A to calculate the reference symbols Ar and Br, and uses these in place of the symbols A and B to calculate the decision variable corresponding to the polarization state change of the received symbol R. This allows the digital coherent differential polarization multilevel optical receiving apparatus 150 to reduce the noise in the decision variable.

As such, the digital coherent differential polarization multilevel optical receiving apparatus 150 reduces the noise included in the reference symbols A1 and AN used as the reference for the change in the polarization state during the demodulation process of the differential multilevel polarization modulation signal by averaging the separately generated estimation symbols A1 to AN and B1 to BN. As a result, the influence by the noise to the decision variable is reduced, which allows for a higher sensitivity.

Here, the estimation symbols A1 to AN and B1 to BN can be generated by the sequential combination of the plurality of polarization states of the polarization multilevel symbols received in the further past, the past value of the decision variable, and the decision result, so that respective estimation symbols have the mutually independent noises, so that the averaging allows for the reduction of the noise.

Further, the digital coherent differential polarization multilevel optical receiving apparatus 150 calculates the weighting average when generating the reference symbols Ar and Br from the symbols A and B and the plurality of estimation symbols A1 to AN and B1 to BN, so that further reduction of the noise can be achieved.

Among the plurality of reference symbols used for the averaging, those estimated from further past received information gradually lose its correlation with the true reference symbol, and thus the SN ratio can be further improved by applying the weighting addition such that the newer one has the larger weight. In this case, the SN can be automatically maximized if the weight is decided using the adaptive equalization filter configured to minimize the output error by the least mean square error.

Further, the digital coherent differential polarization multilevel optical receiving apparatus 150 employs the adaptive equalization filter in the generation of the weight used for the calculation of the weighting averaging to automatically determine the optimal weight that maximizes the SN ratio.

Further, the digital coherent differential polarization multilevel optical receiving apparatus 150 performs the encoding such that the decision variable space is equalized to the position on the Poincare sphere surface and that the signal constellation within the decision variable space is equal to the signal point position of the original polarization multilevel signal at the transmitting side, so that it is necessary to take the influence of the differential encoding into consideration and the decision operation within the decision space at the receiving side is completely equalized to the multilevel decision of the polarization multilevel signal on the typical Poincare sphere, so that the decision circuit can be easily realized.

Further, since the number of the signal points within the decision variable space is always the same as the signal constellation or the number of the signal points of the original multilevel signal, the best decision result can be always obtained if the original signal points are arranged so as to obtain the optimal sensitivity.

Further, such differential polarization modulation advantageously exhibits a high strength against the mutual polarization modulation effect that is the non-linear effect of optical fibers, compared to the typical multilevel polarization modulation which has the same signal constellation. Because, even if the mutual polarization modulation is generated, the reference symbol and the received symbol both are subjected to the same polarization rotation, so that the decision variable based on the difference between them is not likely to change.

On the other hand, the differential polarization multilevel optical transmitter 180 has the differential polarization precoding circuit 181 installed therein configured to perform the encoding so that the decision space formed with the decision variable is equalized to the position on the Poincare sphere surface and that the signal constellation within the decision variable space is equal to the signal constellation of the original polarization multilevel signal at the transmitting side. The differential polarization precoding circuit 181 here has the circuit configured to regard the polarization state of the symbol for transmission as the polarization rotation conversion R on the Poincare sphere to perform the sequential accumulative addition. It is noted that the decision variable extracted by the differential optical polarization multilevel receiver has an amount equal to the rotation conversion Q, and the polarization rotation conversion R is given by the inverse conversion of the rotation conversion Q.

For such the encoding, specifically, assuming that the differential polarization encoding circuit is provided as the polarization rotation conversion R and as the circuit for sequential accumulative addition and that the decision variable extraction operation of the differential optical polarization multilevel receiver is equalized to the inverse conversion from the rotation conversion Q to R, the differential encoding R at the transmitting side cancels the differential operation Q of the differential polarization receiver at the receiving side, so that the change in the position of the multilevel signal point can be suppressed, which allows for easy and efficient implementation of the present invention.

Further, the amplitude and phase or the complex field of the differential polarization modulation signal may be multilevel-modulated or differentially multilevel-modulated. In this case, the combined use of them allows for the increased information transmission amount, so that the transmission system having a further larger capacity and higher efficiency and a higher strength against non-linearity can be achieved compared to the above-described embodiment. In particular, the combined use with the differential multilevel modulation allows for suppression of both mutual phase modulation and mutual polarization modulation, so that the transmission system with a particularly higher strength against non-linearity can be achieved.

Other Embodiment

It is noted that the present invention is not limited to the embodiments described above and thus includes various modifications. For example, the above embodiments have been described in detail for better describing the present invention, and thus it is not necessarily limited to the one that includes all the described components. Further, it is possible to replace a part of one embodiment with the component of another embodiment and it is also possible to add the component of one embodiment to the component of another embodiment. Further, for a part of the components of each embodiment, addition of other components, deletion, or replacement is possible.

Further, for respective component, function, processing unit, processing means, and the like described above, a part of or all them may be implemented as an integrated circuit or other hardware. Further, respective component, function, and the like described above may be implemented by a processor configured to interpret and execute a program that realizes respective function. That is, it may be implemented as software. The information such as a program, a table, a file, and the like realizing each function may be stored in a memory and/or a hard disk, a storage device such as an SSD (Solid State Drive), and a storage medium such as an IC card, an SD card, a DVD, and the like.

Further, the control lines and the information lines are to indicate those that are necessary for the description and therefore not to represent all the control lines and the information lines that are necessary for the product. It can be considered in practice that almost all the components are connected to each other.

What is claimed is:

1. An optical polarization multilevel signal receiving apparatus comprising:
   a differential polarization multilevel receiver configured to receive, from an optical transmission path, an optical polarization multilevel signal which switches among a plurality of polarization states in a plurality of fixed symbol times, and to calculate a plurality of decision variables corresponding to a change in a received polarization state for a received symbol R according to one or more past symbols A used as references in each of the symbol times to decode transmission information, wherein the polarization multilevel receiver includes a multi-symbol polarization estimation circuit which includes:

a polarization state estimation circuit to obtain a plurality of estimation symbols A1 to AN for each of the one or more past symbols A by utilizing, for each of the one or more past symbols A, at least one past polarization multilevel symbol respectively received before the respective one of the past symbols A and at least one past decision result, a polarization state averaging circuit to generate a plurality of reference symbols Ar, for each of the one or more past symbols A, by averaging the respective estimation symbols A1 to AN and the respective one of the past symbols A, and a decision circuit to calculate the decision variables corresponding to the change in the polarization state of the received symbol R using the reference symbols Ar and the received symbol R.

2. The optical polarization multilevel signal receiving apparatus according to claim 1, wherein the multi-symbol polarization estimation circuit further includes a weighting circuit which weights the estimation symbols prior to averaging the respective estimation symbols A1 to AN.

3. The optical polarization multilevel signal receiving apparatus according to claim 1, wherein an amplitude and phase or a complex field of the optical polarization multilevel signal has been multilevel-modulated.

4. The optical polarization multilevel signal receiving apparatus according to claim 1, wherein an amplitude and phase or a complex field of the optical polarization multilevel signal has been differentially multilevel-modulated.

5. The optical polarization multilevel signal receiving apparatus according to claim 1, wherein the polarization multilevel receiver includes a polarization rotation detection circuit which calculates the change in the polarization state of the received symbol, where a polarization state of a transmitted symbol at a transmitting side corresponds to a rotation conversion on a Poincare sphere and the decision variables corresponds to a rotation conversion Q the amount of which is equal to the rotation conversion.

6. An optical polarization multilevel signal communication apparatus comprising:

an optical differential polarization multilevel signal transmitting apparatus configured to transmit an optical polarization multilevel signal and switch the polarization multilevel optical signal among a plurality of polarization states in a plurality of fixed symbol times; and an optical differential polarization multilevel signal receiving apparatus having a polarization multilevel receiver configured to be receive the optical polarization multilevel signal and calculate a plurality of decision variables corresponding to a change in a received polarization state for a received symbol R according to one or more past symbols A used as references in each of the symbol times to decode transmission information, wherein the polarization multilevel receiver includes a multi-symbol polarization estimation circuit which includes:

a polarization state estimation circuit to obtain a plurality of estimation symbols A1 to AN for each of the one or more past symbols A by utilizing, for each of the one or more past symbols A, at least one past polarization multilevel symbol respectively received before the respective one of the past symbols A and at least one past decision result, a polarization state averaging circuit to generate a plurality of reference symbols Ar, for each of the one or more past symbols A, by averaging the respective estimation symbols A1 to AN and the respective one of the past symbols A, and a decision circuit to calculate the decision variables corresponding to the change in the polarization state of the received symbol R using the reference symbols Ar and the received symbol R.

7. The optical polarization multilevel signal communication apparatus according to claim 6, wherein the optical polarization multilevel signal transmitting apparatus includes a differential polarization precoding circuit configured to regard a polarization state of a transmission symbol as a rotation conversion on a Poincare sphere to perform a sequential accumulative addition.

8. The optical polarization multilevel signal communication apparatus according to claim 6, wherein an amplitude and phase or a complex field of the received optical polarization multilevel signal has been multilevel-modulated.

9. The optical polarization multilevel signal communication apparatus according to claim 6, wherein an amplitude and phase or a complex field of the received optical polarization multilevel signal has been differentially multilevel-modulated.

* * * * *